Patented May 19, 1931

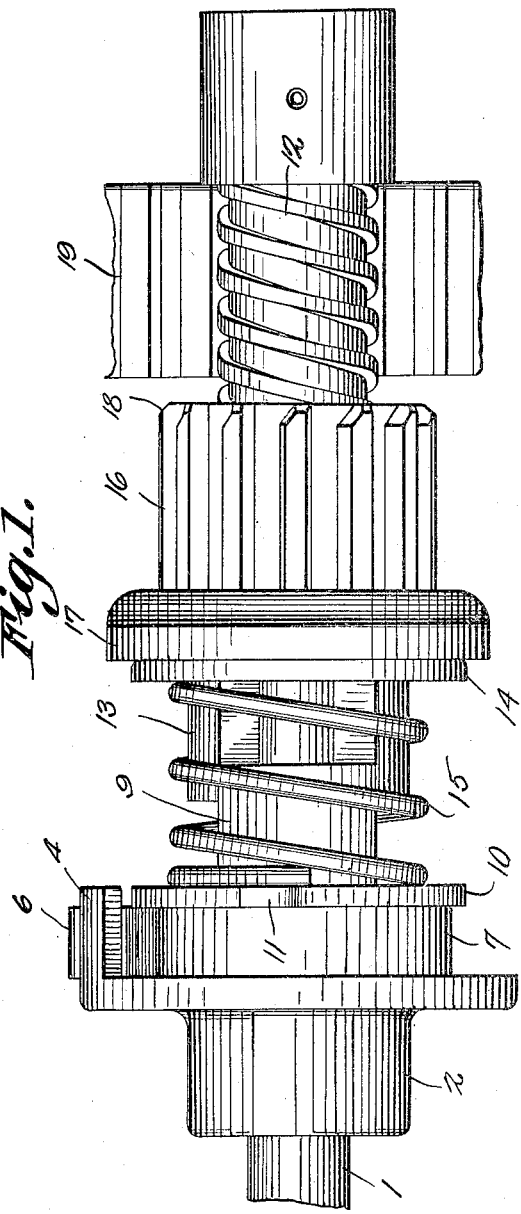
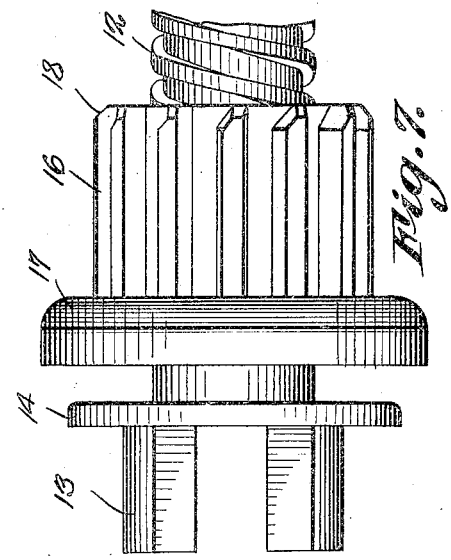
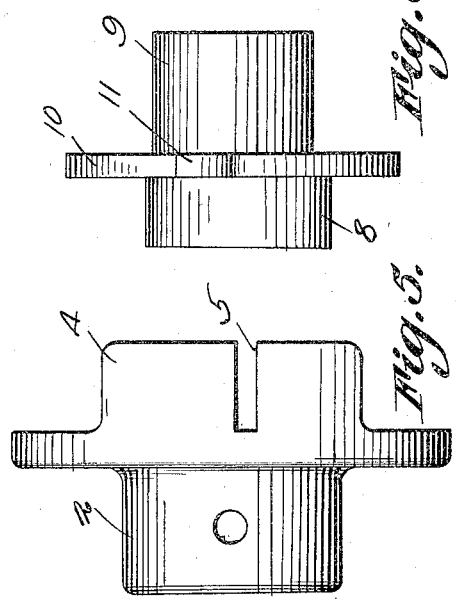

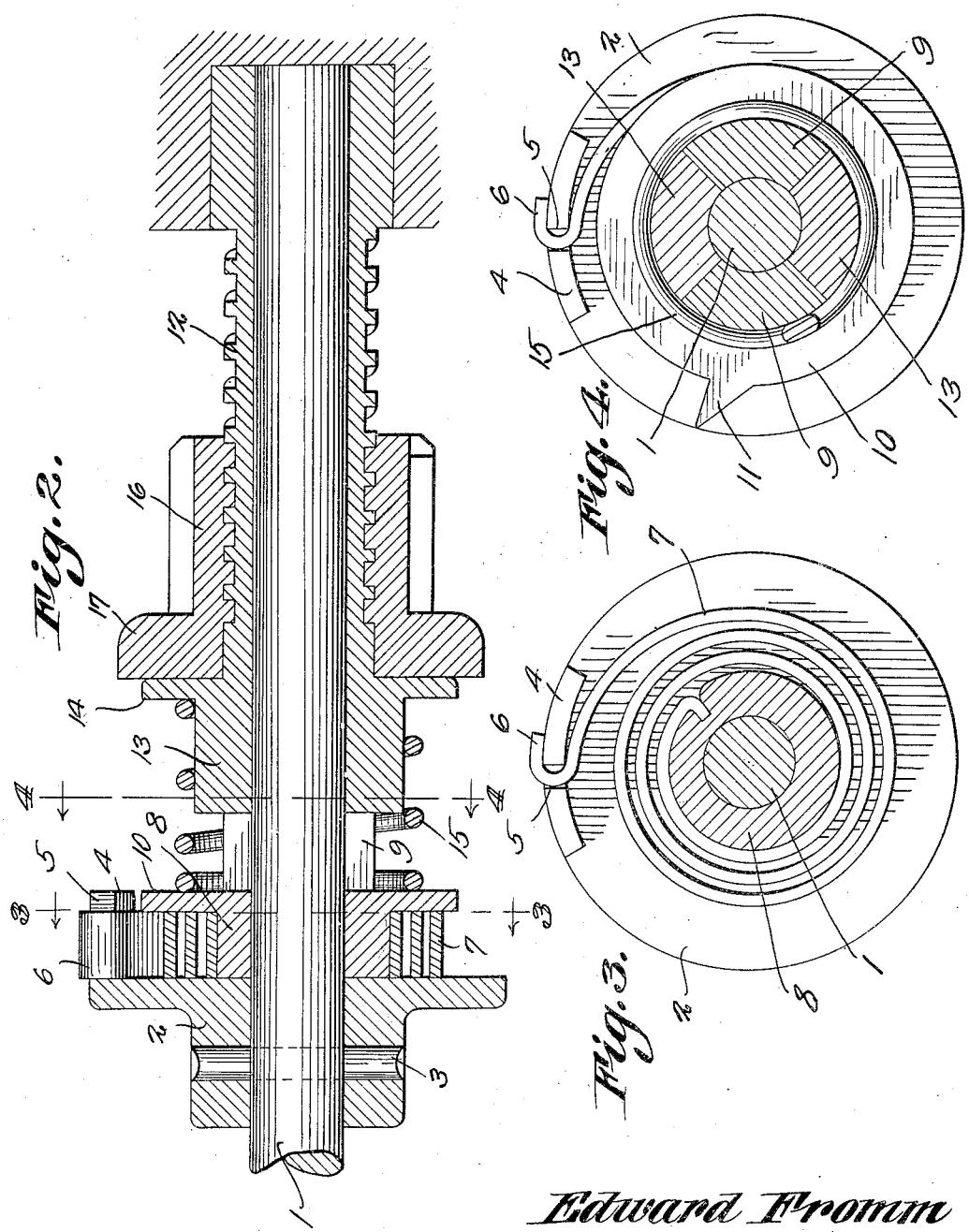

1,805,944

UNITED STATES PATENT OFFICE

EDWARD FROMM, OF IOWA FALLS, IOWA

STARTER MECHANISM

Application filed December 26, 1929. Serial No. 416,665.

This invention relates to the transmission mechanism of self-starters such as used in connection with internal combustion engines. The invention is designed primarily as an improvement upon the well-known "Bendix" drive and it has for an object the elimination of many of the screws heretofore required and which have frequently been sheared off under excessive strain.

Another object is to subject the spring to a more direct pull than heretofore, thereby materially reducing the danger of breakage.

A further object is to provide the transmission with a cushioning means which acts to prevent stripping of the gears on the flywheel.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings,

Figure 1 is a side elevation of the structure, a portion of the gear of the flywheel being shown.

Figure 2 is a longitudinal section through the transmission, the motor shaft being shown in elevation.

Figure 3 is a section on line 3—3, Figure 2.

Figure 4 is a section on line 4—4, Figure 2.

Figure 5 is a plan view of the spring-engaging collar adapted to be secured to the motor shaft.

Figure 6 is a plan view of the spring-actuated clutch member.

Figure 7 is a plan view of a portion of the screw, the clutch member at one end thereof, and the gear mounted on the screw.

Referring to the figures by characters of reference, 1 designates the shaft of the starter motor, the same being mounted in the usual or any preferred manner and being provided with a collar 2 fastened thereto by a pin 3 or the like. This collar has a short lateral flange 4 at the margin thereof formed with a slot 5 in which is seated the hooked end 6 of a flat coiled spring 7 the inner convolution of which engages the hub 8 of a clutch member 9. This hub is mounted to rotate freely on the shaft 1 and is provided with an annular flange 10. The spring 7 is adapted to be housed between this flange and the collar 2. On the flange is formed a stop lug 11 disposed in the path of the flange 4.

A screw 12 in the form of a sleeve is mounted for rotation on the shaft 1 and is provided, at one end, with a clutch member 13 having an annular flange 14. A cushioning spring 15 is interposed between the flanges 10 and 14 and serves to hold them normally pressed apart without, however, entirely removing the clutch members 9 and 13 from engagement with each other.

A gear 16 is mounted on and engages the screw 12 and has a flange 17 at one end which bears normally against the flange 14. The free ends of the teeth on this gear are beveled as shown at 18 and are normally positioned close to but out of mesh with the gear 19 of the flywheel of the starter mechanism.

When the motor of the starter mechanism is set in motion, shaft 1 will be suddenly and rapidly rotated and motion will be transmitted therefrom through collar 2 and spring 7 to the hub 8 of clutch member 9. If the tensioning of the spring fails to properly start the hub 8 and clutch member 9 the flange 4 will come against the lug 11 and positively actuate the parts although with a greatly reduced blow against the lug. Rotation of clutch member 9 will result in rotation of clutch member 13 and as the screw 12 will revolve therewith the gear 16 will be shifted longitudinally of the screw into mesh with gear 19. Thus the engine will be started in the usual way.

If, from any cause, the teeth of the gears 16 and 19 become jammed, so that gear 16 will not properly operate, the continued rotation of screw 12 will cause said screw to feed backwardly within gear 16 and against the action of the cushioning spring 15 until gear 16 has been brought properly into register with the teeth on the flywheel and can move into mesh therewith. Thus danger of stripping the gear teeth is practically eliminated.

By providing the flat coiled spring 7 a more direct pull is transmitted from the shaft 1 to the clutch members than is possible with other types of spring and danger of breakage is greatly reduced.

By providing the catch or lug 11 the spring 7 is relieved from excessive strain because, after it has been brought to a predetermined tension, motion will be transmitted positively from the flange 4 to the lug 11 and clutch member 9.

What is claimed is:

A transmission mechanism for self starters of internal combustion engines including a power shaft, a collar secured thereto, a flange projecting from one face of the collar, a clutch member mounted for rotation on the shaft and constantly thrusting against the collar, an annular flange thereon, a stop lug on said flange in the path of the flange on the collar, a flat spiral spring secured at the end of its outer convolution to the flange on the collar and having its inner convolution secured to the clutch member, said spring being held between the collar and the flange on the clutch member, a screw threaded sleeve slidably and rotatably mounted on the shaft, a clutch member at one end thereof in sliding engagement with the first named clutch member, a gear threaded on the sleeve, and a cushioning spring between and pressing in opposite directions against the clutch members.

In testimony that I claim the foregoing as my own, I have hereto affixed my signature.

EDWARD FROMM.